US012687396B2

(12) United States Patent
Yamamoto et al.

(10) Patent No.: US 12,687,396 B2
(45) Date of Patent: Jul. 21, 2026

(54) INFORMATION PROCESSING APPARATUS, VEHICLE, INFORMATION PROCESSING METHOD, AND STORAGE MEDIUM

(71) Applicant: CANON KABUSHIKI KAISHA, Tokyo (JP)

(72) Inventors: Keiichi Yamamoto, Kanagawa (JP); Makoto Tomioka, Kanagawa (JP)

(73) Assignee: CANON KABUSHIKI KAISHI, Tokyo (JP)

( * ) Notice: Subject to any disclaimer, the term of this patent is extended or adjusted under 35 U.S.C. 154(b) by 503 days.

(21) Appl. No.: 17/929,319

(22) Filed: Sep. 2, 2022

(65) Prior Publication Data

US 2023/0072508 A1     Mar. 9, 2023

(30) Foreign Application Priority Data

Sep. 8, 2021     (JP) ................................. 2021-146513

(51) Int. Cl.
*G01C 21/16* (2006.01)
*G01C 25/00* (2006.01)

(52) U.S. Cl.
CPC ......... *G01C 21/165* (2013.01); *G01C 25/005* (2013.01)

(58) Field of Classification Search
CPC ................ G01C 21/165; G01C 25/005; G01C 21/1656; G01C 21/3602
See application file for complete search history.

(56) References Cited

U.S. PATENT DOCUMENTS

| | | | |
|---|---|---|---|
| 2017/0153646 A1 | 6/2017 | Shin | |
| 2021/0067693 A1* | 3/2021 | Matsuoka | H04N 23/633 |
| 2021/0190535 A1* | 6/2021 | Tomioka | G05D 1/0246 |
| 2022/0215674 A1* | 7/2022 | Wada | G06V 20/588 |
| 2023/0110992 A1* | 4/2023 | Numakami | G05D 1/0246 |
| | | | 382/103 |

FOREIGN PATENT DOCUMENTS

| | | | |
|---|---|---|---|
| JP | 2008-76389 A | | 4/2008 |
| JP | 2011141221 A | * | 7/2011 |
| JP | 2012016817 A | * | 1/2012 |

(Continued)

OTHER PUBLICATIONS

Japanese Office Action issue Feb. 27, 2024 during prosecution of related application No. JP 2021-146513 (with machine generated English translation).

(Continued)

*Primary Examiner* — Scott A Browne
*Assistant Examiner* — Nazia Afrin
(74) *Attorney, Agent, or Firm* — VENABLE LLP

(57)     ABSTRACT

The information processing apparatus comprises an inertial sensor provided in a vehicle; a position and orientation estimation unit for performing estimation processing for a position and orientation of the vehicle by using an output from the inertial sensor; a movement state acquisition unit for acquiring a movement state of the vehicle; and a first weighting determining unit for determining a first weighting in relation to output information from the inertial sensor in the estimation processing of the position and orientation estimation unit based on the movement state that has been acquired by the movement state acquisition unit.

16 Claims, 8 Drawing Sheets

(56)　　　　　　　References Cited

FOREIGN PATENT DOCUMENTS

| | | | | | |
|----|----------------|------|---|---------|-------------------|
| JP | 2016194956 | A  | * | 11/2016 | ............. G01C 3/085 |
| JP | 2017129992 | A  | * | 7/2017  | ............. G02B 27/32 |
| JP | 2019139548 | A  | * | 8/2019  | .......... G05D 1/0088 |
| JP | 2021-96731 | A  |   | 6/2021  | |
| JP | 6898272 | B2 | * | 7/2021  | |
| JP | 2021194259 | A  | * | 12/2021 | ............. A63F 13/211 |
| JP | 2022105431 | A  | * | 7/2022  | ............... G06T 7/74 |
| WO | WO-2015108066 | A1 | * | 7/2015  | ............. G01C 21/20 |
| WO | WO-2019116658 | A1 | * | 6/2019  | ......... G06K 9/00362 |
| WO | WO-2021065510 | A1 | * | 4/2021  | ......... G01C 21/1652 |

OTHER PUBLICATIONS

Japanese Office Action issued Jun. 25, 2024 during prosecution of related application No. JP 2021-146513 (with machine generated English translation).
U.S. Appl. No. 17/960,194, filed Oct. 5, 2022 by Yukio Numakami, et al.

* cited by examiner

INFORMATION PROCESSING APPARATUS, VEHICLE, INFORMATION PROCESSING METHOD, AND STORAGE MEDIUM

BACKGROUND OF THE INVENTION

Field of the Invention

The present invention relates to an information processing apparatus that can estimate the position and orientation of a vehicle, a vehicle, an information processing method, a storage medium, and the like.

Description of Related Art

In order to automatically move a vehicle such as a transport vehicle (for example, an AGV (automated guided vehicle) or the like, in an environment such as a factory or a physical distribution warehouse, position and orientation calculation technologies have been proposed. There is a method for increasing the precision of position and orientation calculations by using a plurality of types of sensors and comprehensively calculating the position and orientation in a case where a vehicle is made to run autonomously. For example, in Japanese Unexamined Patent Application Publication No. 2011-141221, a translation vector and a rotation matrix that have been calculated using an inertial sensor are corrected based on their differences between the translation vector and a rotary matrix that have been calculated by using an image capturing apparatus.

However, in the method of Japanese Unexamined Patent Application Publication No. 2011-141221, there is the problem that when the acceleration of the vehicle is low, or the like, the noise from the inertial sensor cannot be disregarded, and the precision of the position and orientation estimation is lowered.

The present invention takes the above-described problem into consideration, and one of its purposes is to provide an information processing apparatus that can reduce the lowering of the precision of the position and orientation estimation for a vehicle.

SUMMARY OF THE INVENTION

An information processing apparatus according to one aspect of the present invention comprises an inertial sensor provided in a vehicle, and at least one processor or circuit configured to function as:

a position and orientation estimation unit configured to perform estimation processing for a position and orientation of the vehicle by using an output from the inertial sensor;

a movement state acquisition unit configured to acquire a movement state of the vehicle; and a first weighting determining unit configured to determine a first weighting in relation to output information from the first inertial sensor in the estimation processing of the position and orientation estimation unit based on the movement state that has been acquired by the movement state acquisition unit.

Further features of the present invention will become apparent from the following description of embodiments with reference to the attached drawings.

BRIEF DESCRIPTION OF THE DRAWINGS

FIG. 1 illustrates a functional block diagram showing an example of a configuration of an information processing apparatus or the like in a First Embodiment.

FIG. 4 illustrates a functional block diagram showing an example of a configuration of an information processing apparatus or the like in the Second Embodiment.

DETAILED DESCRIPTION OF THE INVENTION

Figure 2:
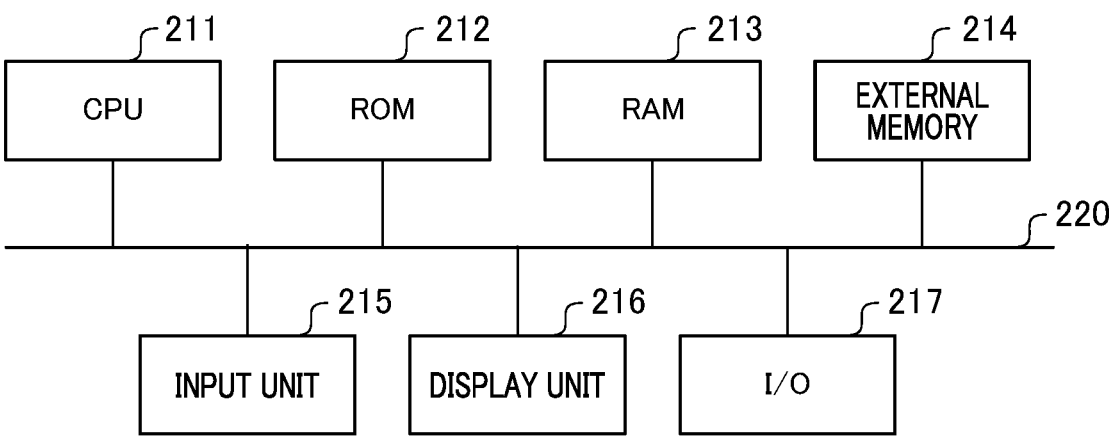
FIG. 2 illustrates a block diagram showing an example of a hardware configuration of an information processing apparatus 100 in the First Embodiment.

Hereinafter, with reference to the accompanying drawings, favorable modes of the present invention will be described using Embodiments. In each diagram, the same reference signs are applied to the same members or elements, and duplicate descriptions will be omitted or simplified.

In addition, in the Examples, an AGV (Automated Guided Vehicle), or an AMR (Automatic Mobile Robot) may serve as the vehicle. However, the vehicle includes articles capable of movement such as automobiles, trains, airplanes, motorcycles, drones, robots, and the like.

First Embodiment

In the First Embodiment, an example will be explained in which a first weighting in relation to output information from an inertial sensor is determined based on a movement state of a vehicle, and the position and orientation of the vehicle is estimated (calculated) based on an image capturing apparatus or a distance measuring apparatus, the output information from the inertial sensor, and the first weighting.

In particular, in the First Embodiment, the usage ratio of the inertial sensor is lowered by setting the first weighting to be low in a case where the vehicle is in a state of rest, and the lowering of the precision of the position and orientation estimation is reduced by reducing the effects of the noise from the inertial sensor.

Figure 1:
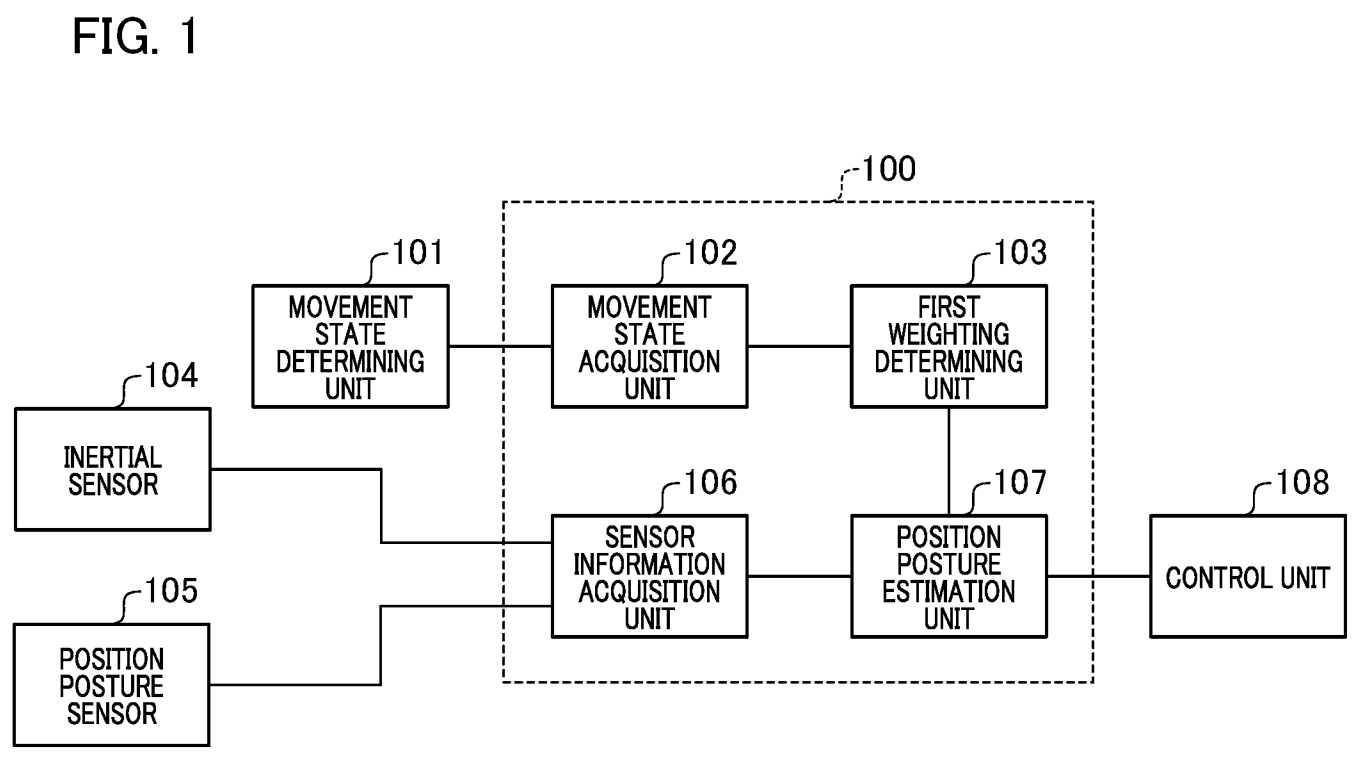

FIG. 1 illustrates a functional block diagram showing an example of a configuration of an information processing apparatus or the like in the First Embodiment.

Note that a portion of the functional blocks that are shown in FIG. 1 are realized by a computer program that has been stored on a memory serving as a storage medium being executed by a computer to be described below that is included in the information processing apparatus. However, a portion or all of these may also be made so as to be realized using hardware. An application-specific integrated circuit (ASIC), a processor (reconfigurable processor, DSP), or the like can be used as the hardware.

In addition, each of the functional blocks that are shown in FIG. 1 do not necessarily have to be built into the same housing, and the information processing apparatus may also be configured by individual apparatuses that are connected to each other via a signal path. Note that the above explanation in relation to FIG. 1 also applies to the functional block diagram in FIG. 4.

In FIG. 1, a movement state determining unit 101 determines a movement state of a vehicle based on output information from a movement sensor for measuring the movement state of the vehicle. There may be one inertial sensor, or there may also be a plurality of movement sensors. In the First Embodiment, an image capturing apparatus (image capturing unit) such as, for example, a stereo camera or the like is used as a movement sensor. In addition, in the First Embodiment, it is determined whether or not the movement state of the vehicle is in a state of rest.

Tracking the movements of the same feature points in past and present images from a time series image that has been obtained from an image capturing apparatus (image capturing unit) such as a stereo camera or the like serves as the method for determining the state of rest of the vehicle. In a case where the average value of the movement amount for the same feature points is 0, or smaller than a predetermined threshold, that is, in a case where the number of feature points that have not moved from the past to the present is smaller than a predetermined threshold, it is determined that the movement state of the vehicle is a state of rest.

The movement state acquisition unit 102 is a functional configuration unit that acquires the movement state of the vehicle that has been determined by the movement state determining unit 101. In this context, the movement state includes at least one of whether or not the movements of the vehicle are at or below a predetermined threshold, whether or not the acceleration of the vehicle is at or below a predetermined threshold, and whether or not the angular velocity of the vehicle is at or below a pre-determined threshold. In addition, the values for the acceleration and angular velocity may also be used as is to serve as the current acceleration state and angular velocity state.

A first weighting determining unit 103 is a functional configuration unit that determines a first weighting based on the movement state of the vehicle, which has been acquired by the movement state acquisition unit 102. The first weighting is a weighting that is applied to the output information from the inertial sensor 104, and is shown as a decimal fraction between 0 and 1. In a case where the first weighting is 0, the output information from the inertial sensor 104 will not be used in the position and orientation determination, and in a case where it is 1, 100% of the output information will be used.

In addition, the first weighting determining unit in the Examples may be made to determine the first weight as 0, or as a value that is smaller than the normal value, in a case where the acceleration and angular velocity of the vehicle are lower than a predetermined threshold. In addition, the first weight may be the values for the acceleration and angular velocity, and may increase as these values increase.

Note that the first weight determining unit 103 may determine the weighting that is relative to the output from the inertial sensor 104 in relation to another output from the position and orientation sensor 105 or the like instead of determining the weighting that is directly applied to the output from the inertial sensor 104.

That is, for example, the weight of the output from the inertial sensor 104 may also be relatively lowered by raising the weight of the output from the position and orientation sensor 105 instead of directly lowering the weight of the output information from the inertial sensor 104. In this way, the first weight determining unit includes articles that relatively determine the weight of the output information from the inertial sensor 104 in relation to other output from the position and orientation sensor 105 or the like.

The inertial sensor 104 is an inertial measurement unit (IMU) or the like that has been fixed to the vehicle in order to estimate the position and orientation of the vehicle. Note that the inertial measurement unit (IMU) moves and rotates in joint operation with the movement and rotation of the vehicle, and therefore, the position and orientation of the vehicle corresponds to the position and orientation of the inertial measurement unit.

The position and orientation sensor 105 is a position and orientation sensor that has been provided separately from the inertial sensor 104 in order to detect the position and orientation of the vehicle, and there may be one or also a plurality provided. In the First Embodiment, an image capturing apparatus (image capturing unit) such as a stereo camera or the like is used as the position and orientation sensor.

The stereo camera is fixed to the vehicle, and the stereo camera moves and rotates in joint operation with the movement and rotation of the vehicle. Therefore, the position and orientation of the vehicle corresponds to the position and orientation of the stereo camera. Note that the same stereo camera may also serve two purposes and be used as a movement sensor for measuring the movement state of the vehicle.

A sensor information acquisition unit 106 acquires output information from the inertial sensor 104 and the position and orientation sensor 105.

A position and orientation estimation unit 107 estimates the position and orientation of the vehicle based on the first weight that has been determined by the first weight determining unit 103, and the output information from the inertial sensor 104 and the position and orientation sensor 105 that has been acquired by the sensor information acquisition unit 106.

A control unit 108 determines the direction in which the vehicle should move next, and the movement amount based on the position and orientation that has been estimated by the position and orientation estimation unit 107, and drives the motor and engine that are connected to the wheels and the like of the vehicle just the amount that is needed for this movement. In the First Embodiment, the direction and movement amount for progressing along a predetermined movement path are determined based on the current position and orientation.

Note that the control unit 108 has a built in CPU 211 that serves as a computer, as will be described below, and controls the operations of each unit of the entire apparatus based on a computer program that has been stored on a memory serving as a storage medium.

In this context, the information processing apparatus 100 in the First Embodiment is configured by the movement state acquisition unit 102, the first weight determining unit 103, the sensor information acquisition unit 106, the position and orientation estimation unit 107, and the like. It is assumed that the inertial sensor 104, the position and orientation sensor 105, the movement state determining unit 101, and the control unit 108 are built into the vehicle. In addition, the movement state determining unit 101 and the control unit 108 may also be included in the information processing apparatus 100. Or, the information processing apparatus 100 itself may also be built into the vehicle.

FIG. 2 illustrates a block diagram showing an example of a hardware configuration of the information processing apparatus 100 in the First Embodiment. 211 denotes a CPU that serves as a computer, and performs the control of each type of device that has been connected to the system bus 220. 212 denotes a ROM, and stores a BIOS program and a boot program. 213 denotes a RAM, and is used as the primary storage apparatus for the CPU 211.

214 denotes an external memory, and stores a computer program that is processed by the information processing apparatus 100. An input unit 215 denotes a keyboard and a mouse, a robot controller, or the like, and performs processing according to the input of information and the like. The display unit 216 outputs the calculation results of the information processing apparatus 100 on a display apparatus according to commands from the CPU 211.

Note that the display apparatus may be a liquid crystal display apparatus, a projector, an LED indicator, or the like, and the type thereof is not limited. 217 denotes an I/O that performs information communications via a communication interface, wherein the communication interface may be the internet, or may also be USB or serial communications, wireless communications, or the like, and the variety thereof is not limited. The I/O receives output information from each type of sensor, or from another information processing apparatus.

Figure 3:
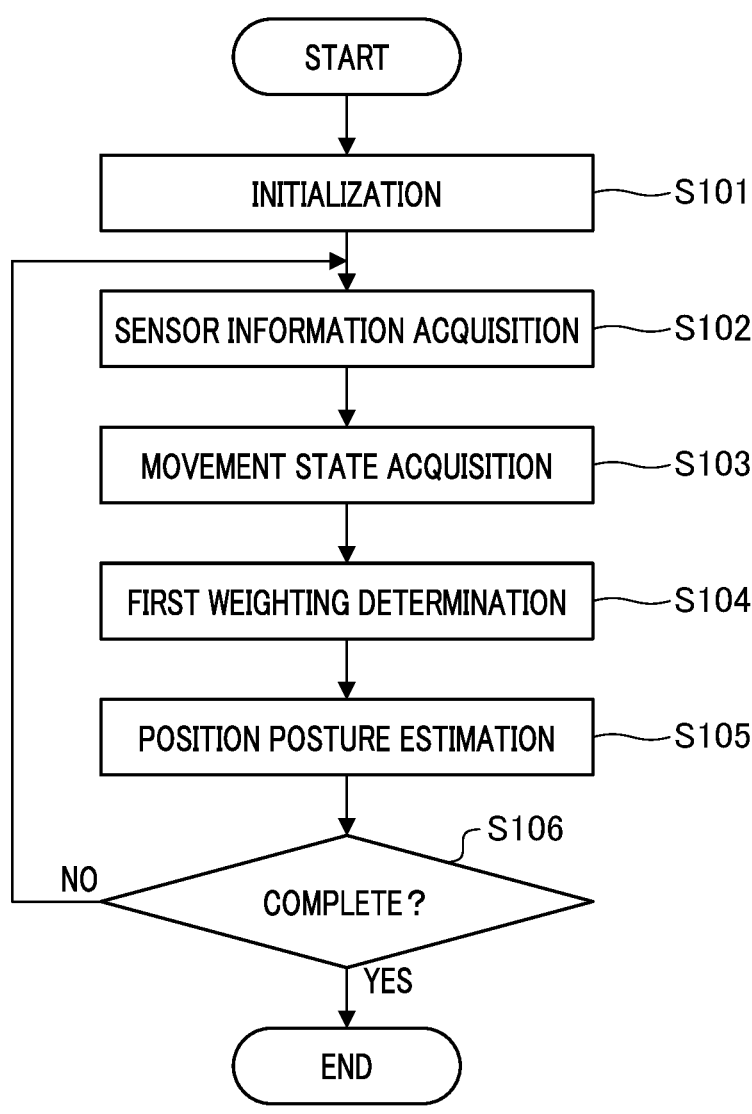
FIG. 3 illustrates a flow chart showing processing executed by an information processing apparatus in the First Embodiment.

FIG. 3 illustrates a flow chart showing processing executed by an information processing apparatus in a First Embodiment. Note that the operations for each step in FIG. 3 are performed by the internal CPU 211 of the control unit 108 that serves as a computer that executes a computer program that has been stored on the external memory 214. Note that the same also applies to each flow chart in FIGS. 5 to 7, which will be explained below.

In step S101, the initialization of the information processing apparatus 100 is performed. That is, the computer program is loaded from the external memory 214, and the information processing apparatus 100 is put into an operable state. In addition, each type of settings parameter, for example, parameters such as each type of threshold to be explained below, the initial value for the first weight, and the like are loaded from the external memory 214 onto the RAM 213 according to necessity.

In step S102, the sensor information acquisition unit 106 acquires the output information from the inertial sensor 104 and the position and orientation sensor 105. In the First Embodiment, the inertial sensor 104 and the position and orientation sensor 105 are fixed to the vehicle, and each of the sensors move and rotate in joint operation with the movement and rotation of the vehicle. Therefore, the position and orientation of the vehicle corresponds to the position and orientations of each sensor.

In step S103 (movement state acquisition process), the movement state acquisition unit 102 acquires the movement state of the vehicle that has been determined by the movement state determining unit 101. In the First Embodiment, whether or not, for example, the vehicle is at rest (or the movement is at or below a predetermined threshold) is acquired.

In step S104 (first weight determining process), the first weight determining unit 103 determines the first weight based on the movement state of the vehicle that has been acquired by the movement state acquisition unit 102. Although the first weight is set as an initial value in step S101, however, it may be made possible to set this to a different value using a user operation. The initial value will be set as, for example, 1.

If the first weight that the output information from the inertial sensor 104 is multiplied by is 1, 100% of the output information from the inertial sensor 104 will be used in the estimation of the position and orientation of the vehicle.

In the First Embodiment, in a case where the movement state of the vehicle is not a state of rest, the initial value of 1 that was set in step S101 or the value that was set by a user operation is determined. In addition, in a case where the movement state of the vehicle is a state of rest, the first weight is set to zero or to a value that is smaller than the value for the case in which the vehicle is not in a state of rest.

If the first weight is 0, the output information from the inertial sensor 104 is multiplied by zero, and it is not used in the estimation of the position and orientation for the vehicle. In addition, if the first weight is a value that is lower than the value for the case in which the vehicle is not in a state of rest, the usage ratio for the output information from the inertial sensor 104 in the estimation of the position and orientation for the vehicle is lowered.

In Step S105, the position and orientation estimation unit 107 estimates the position and orientation of the vehicle based on the first weighting that has been determined by the first weighting determining unit 103, and the output information from the inertial sensor 104 and the position and orientation sensor 105 that have been acquired by the sensor information acquisition unit 106.

Step 105 configures a position and orientation estimation process. In the First Embodiment, the position and orientation of the vehicle is estimated based on the position and orientation information from the position and orientation sensor 105, and the output information from the inertial sensor 104 after it has been multiplied by the first weighting.

In the First Embodiment, in relation to the estimation method for the position and orientation, which uses the output of a camera that serves as the position and orientation sensor 105, and the output of the inertial sensor 104, an ORB-SLAM 3 method is used. With respect to the specific method of ORB-SLAM 3, there is a detailed description thereof in Campos et. al's method (Carlos Campos et. al, ORB-SLAM 3: An Accurate Open-Source Library for Visual, Visual-Inertial, and Multi-Map SLAM. Cornel University), and the like, and therefore an explanation will be omitted.

In step S106, whether the entirety of the processing of the information processing apparatus 100 has been completed or not is determined. For example, in a case where the vehicle has arrived at the intended destination, or in a case where a completion command from the user is received by the input unit 215, this processing will be completed. If the result is No in step S106, the processing returns to Step S102, and continues.

In this manner, in the First Embodiment, by setting the first weighting low in a case where the vehicle is in a state of rest (or if the movement is at or below a predetermined threshold), the usage ratio of the inertial sensor 104 is lowered, and the effects of the noise from the inertial sensor 104 are reduced. It is thereby possible to reduce the lowering of the precision of the position and orientation estimation.

Note that in the First Embodiment, an image capturing unit such as a stereo camera or the like is used as the movement sensor for measuring the movement state of the vehicle. However, it is not limited thereto. For example, a single-lens camera, a camera with three or more lenses, a distance measuring apparatus, an encoder that measures the rotation amount and the like of the motor that rotates the wheels of the vehicle, a GPS (Global Position System), or the like, may also be used.

Alternatively, a drive command to a drive source such as a motor, engine, or the like that is connected to the wheels or the like of the vehicle may also be used. Furthermore, a camera that has been disposed to acquire images of the outside of the vehicle, a drone that has been equipped with a camera, or the like may also be used, and it is sufficient if at least one of the above-described plurality of sensors is used. Furthermore, these may also be appropriately combined and used.

Note that with respect to the position and orientation sensor 105 for detecting the position and orientation of the vehicle as well, an image capturing apparatus (image capturing unit) that captures images of a subject such as a stereo camera or the like has been used in the above-described example. However, this is not limited thereto, and may also be, for example, a distance measuring apparatus for measuring the distance to the subject, a GPS, or the like. In addition, sensing technologies such as LiDAR (Light Detection and Ranging), or the like may also be used.

Furthermore, a camera that has been disposed to look down on the space from outside of the vehicle, a camera that has been built into a drone, or the like may also be used, and it is sufficient if at least one of the above is used. The variety is not limited as long as the output information that is necessary in order to estimate the position and orientation of the vehicle can be obtained. In addition, the above plurality of sensors may also be used in combination.

In the First Embodiment, an example was explained in which whether or not the vehicle is at rest is determined based on the movement amounts of feature points between the past and present in a time series image that has been obtained from a stereo camera as the method for the movement state determining unit 101 to acquire whether or not the vehicle is in a state of rest (or the movement is at or below a predetermined threshold).

However, the method is not limited thereto. For example, being in a state of rest may be determined if the movement amount for the feature points in a distance image acquired by a distance measuring apparatus instead of a stereo camera is 0, or at or below a predetermined threshold.

In addition, being in a state of rest may be determined if a rotation amount obtained from an encoder that measures the rotation amount or the like of a motor that rotates the wheels of the vehicle is 0, or at or below a pre-determined threshold. Or, a state of rest may be determined based on a drive command to the motor, which is connected to the wheels and the like of the vehicle, and in a case where the drive command is not issued.

Furthermore, being in a state of rest may also be determined if the position of the vehicle that has been measured by a GPS, a camera that has been disposed to acquire images of outside of the vehicle, a camera that has been built into a drone, or the like has not changed, or if the change amount is at or below a predetermined threshold with the progression of time.

Note that in the First Embodiment, it has been assumed that the movement state of the vehicle that is determined by the movement state determining unit 101 is a state of rest (or a state in which the movement is at or below a predetermined threshold), however, the determination is not limited thereto. For example, the acceleration can be calculated by performing double differentiation by a unit time on the movement amount of the vehicle for the unit time, which has been acquired from a sensor for measuring the movement state, and it may be determined that the vehicle is in a low acceleration state in a case where this acceleration is at or below a predetermined threshold.

In the same manner, the angular velocity may be calculated by performing single differentiation on the movement amount in the rotation direction of the vehicle by a unit time, and a low angular velocity state may also be determined in a case where this angular velocity is at or below a predetermined threshold. In addition, the acceleration and angular velocity may also be used as is for the values for the acceleration state and the angular velocity state without a threshold determination. Furthermore, the above-described plurality of methods may also be appropriately combined and used for the determination of the movement state of the vehicle.

In addition, in the First Embodiment, in a case where the movement state of the vehicle is a state of rest (or a state in which the movement is at or below a specific threshold), the first weighting was determined as 0, or as a value that is lower than the value for a case in which the vehicle is not in a state of rest. However, the invention is not limited thereto. For example, in a case where the vehicle is in a state in which the acceleration or the angular velocity is lower than a threshold, a state in which the acceleration is low, or a state in which the angular velocity is low, the first weighting may also be determined to be 0, or a value that is lower than the regular value. In addition, it may also be made so that the values for the acceleration and angular velocity are not compared to a threshold, but instead the value for the first weighting is made larger as these values increase.

In addition, in the First Embodiment, the position and orientation of the vehicle has been estimated based on the output information from the position and orientation sensor 105, and the output information from the inertial sensor 104 that has been multiplied by the first weighting. However, the estimation of the position and orientation is not limited thereto. For example, it may also be made such that in a case where the first weighting is at or below a predetermined threshold, the output information from the inertial sensor 104 is not used.

In addition, the position and orientation that has been estimated from the output information of the position and orientation sensor 105, and the position and orientation that has been estimated from the output information from the inertial sensor 104 after it has been multiplied by the first weighting may also be synthesized. In addition, the position and orientation that has been estimated from the output information from the position and orientation sensor 105, and the position and orientation that has been estimated based on the output information from the inertial sensor 104 and then been multiplied by the first weighting may also be synthesized. As the method for estimating the position and orientation using the position and orientation sensor 105 of a camera or the like, estimation of the position and orientation of the vehicle may be performed using, for example, bundle adjustment.

Bundle adjustment is processing that measures the position and orientation of a camera in which the total (residual) difference for a projection point in which a three dimensional position of an image feature that has been retained as a map for measuring the position and orientation has been projected onto a key frame, and the image feature position that has been detected from the image data that was captured at the time of the automatic driving becomes as small as possible.

Raul et. al's method (Raul Mur-Artal et. al, ORB-SLAM: A Versatile and Accurate Monocular SLAM System. IEEE Transaction Robotics) contains detailed disclosures relating to these key frames and bundle adjustment, and therefore, an explanation thereof will be omitted.

As the estimation method for the position and orientation using the inertial sensor 104, a displacement amount is calculated by performing double integration by a unit time on the acceleration, which is output information from the inertial sensor 104, and the position is estimated. In the same manner, an angle is calculated by performing single integration by a unit time on the angular velocity, which is output information from the inertial sensor, and the posture is estimated.

In addition, a loosely coupled format (loose coupling) that aggregates the position and orientation measurement results of each of the position and orientation sensor 105 and the inertial sensor 104 of the camera and the like, or a tightly coupled format (tight coupling) that executes position and orientation measurement by aggregating the two types of sensor data may also be used.

Specifically, at the time of the above-described bundle adjustment, the position and posture are corrected by using the output information from the inertial sensor 104, and position and orientation estimation is performed. In addition, a method based on measuring the radio wave intensity in wireless communications such as Wi-Fi may also be used, or methods that use the time differences in detecting light that is traversing a space using satellite positions such as GPS, magnetic tracking sensors, or a plurality of light sensors may also be used.

Second Embodiment

In a Second Embodiment, in a case where an image capturing apparatus (image capturing unit), a distance measuring apparatus (distance measuring unit), or the like is used as the position and orientation sensor 105, a second weight is determined based on the degree of reliability of the output information therefrom. In addition, the position and orientation of the vehicle is estimated based on the output information from the image capturing apparatus or distance measuring apparatus, and the inertial sensor 104, as well as the first weighting and the second weighting.

In particular, by setting the second weighting as low in a case where the degree of reliability of the output information from the image capturing apparatus or distance measuring apparatus that serves as the position and orientation sensor 105 is low, the usage ratio of incorrect sensor output information is lowered, and it is possible to reduce the lowering of the precision of position and orientation estimations.

Figure 4:
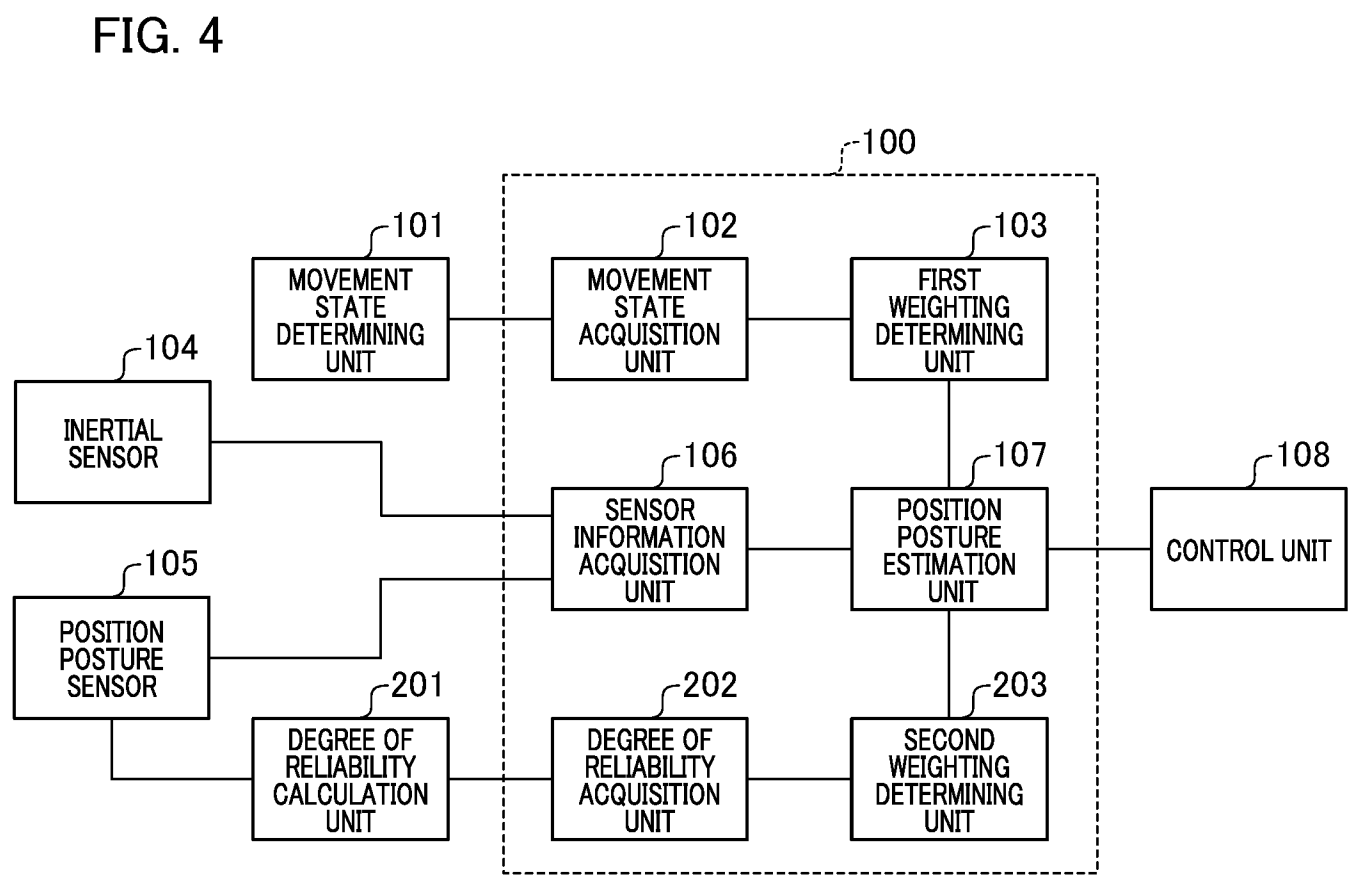

FIG. 4 illustrates a functional block diagram showing an example of a configuration of an information processing apparatus or the like in the Second Embodiment. FIG. 4 differs from FIG. 1 on the point that a degree of reliability calculation unit 201, a degree of reliability acquisition unit 202, and a second weighting determining unit 203 have been provided, as well as on the processing for the position and orientation estimation unit 107. In this context, only the portions that differ from the First Embodiment will be explained.

The degree of reliability calculation unit 201 calculates the degree of reliability for the output information from the position and orientation sensor 105 in relation to the position and orientation estimation for the vehicle. In the Second Embodiment, the degree of reliability is calculated based on output information from the image capturing apparatus such as, for example, the stereo camera or the like that is used as the position and orientation sensor 105.

Specifically, for example, in a case where the number of feature points in an image that has been captured by the image capturing apparatus such as a stereo camera or the like that is used as the position and orientation sensor 105 is small, the degree of reliability will be made low.

The degree of reliability acquisition unit 202 acquires the degree of reliability that has been calculated by the degree of reliability calculation unit 201. The second weighting determining unit 203 determines a second weighting based on the degree of reliability that has been acquired by the degree of reliability acquisition unit 202. For example, in a case where the degree of reliability is low, the second weighting will also be determined so as to be low.

The position and orientation estimation unit 107 estimates the position and orientation of the vehicle based on the first weighting, the second weighting, and the output information from the inertial sensor 104 and the position and orientation sensor 105 that has been acquired by the sensor information acquisition unit 106.

Note that the second weighting determining unit 203 also includes a determination of a relative weight for the output from the position and orientation sensor 105 in relation to the output from the inertial sensor 104, instead of a determination for a weight that is directly applied to the output information from the position and orientation sensor 105. That is, the second weighting determining unit includes relative determinations of the weight of the output information from the position and orientation sensor 105 in relation to the output from the inertial sensor 104.

Figure 5:
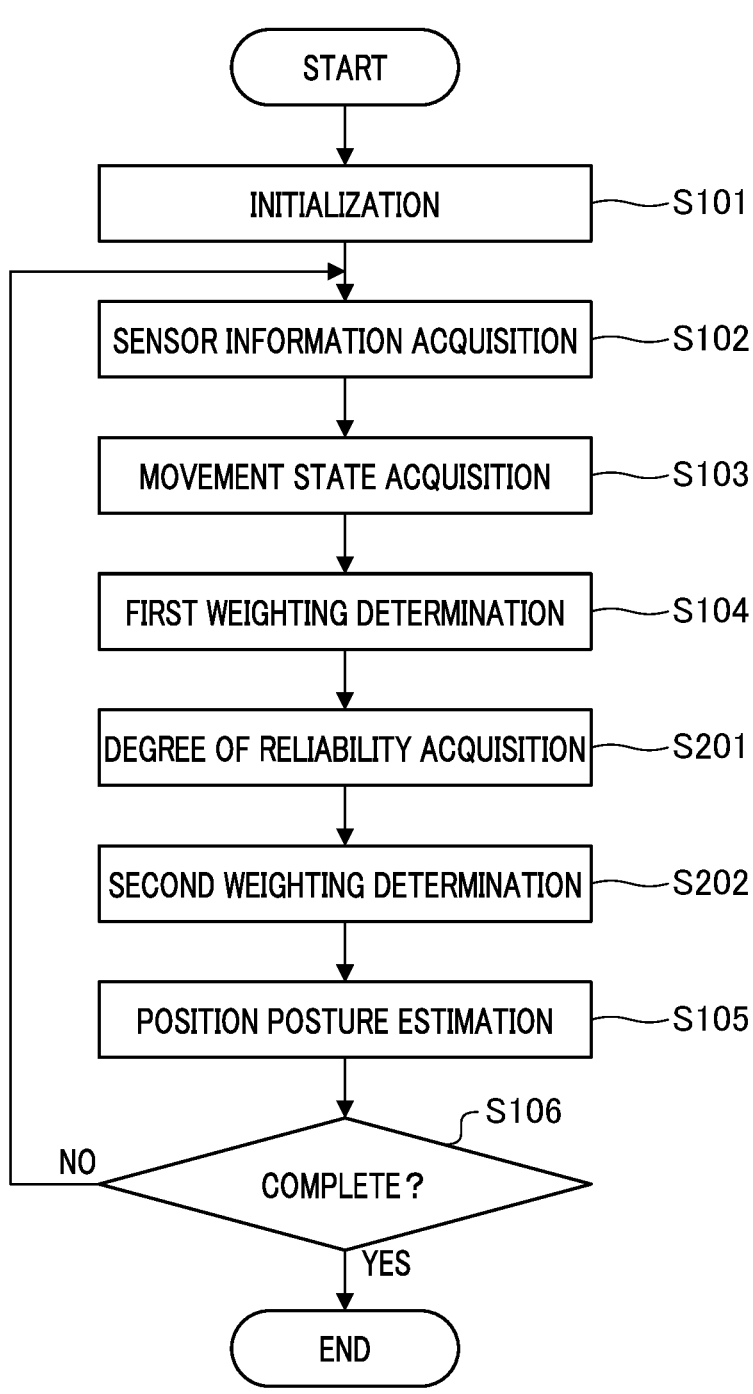
FIG. 5 illustrates a flowchart showing processing executed by an information processing apparatus in the Second Embodiment.

FIG. 5 illustrates a flowchart showing processing executed by an information processing apparatus in the Second Embodiment. Explanations with respect to the steps that are the same as those in the flow chart in FIG. 3 will be omitted, and only the processing that differs from that in the flow chart in FIG. 3 will be explained.

In step S201 (degree of reliability acquisition process), the degree of reliability acquisition unit 202 acquires the degree of reliability that has been calculated by the degree of reliability calculation unit 201.

In step S202 (second weighting determining process), the second weighting determining unit 203 determines the second weighting based on the degree of reliability that has been acquired by the degree of reliability acquisition unit 202. The second weighting is pre-set to an initial value in step S201. However, it may also be set to a different value by a user operation. For example, the initial value is set as 1.

If the second weighting that the output information from the position and orientation sensor 105 is multiplied by is 1, 100% of the output information from the position and orientation sensor 105 will be used in the estimation of the position and orientation of the vehicle.

In the Second Embodiment, in a case where the degree of reliability is at or below a predetermined threshold, the second weighting will be set as 0, or to a value that is lower than the value for the case in which the degree of reliability is not at or below the threshold. If the second weighting is 0, the output information from the position and orientation sensor 105 will be multiplied by 0, and will not be used in the estimation of the position and orientation of the vehicle.

In addition, if the second weighting is a value that is lower than the value for the case in which the degree of reliability is at or below the threshold, the usage ratio of the output information from the position and orientation sensor 105 in the estimation of the position and orientation of the vehicle will be lowered.

In step S105, the position and orientation estimation unit 107 estimates the position and orientation of the vehicle based on the first weighting, the second weighting, the output information from the inertial sensor 104, and the output information from the position and orientation sensor 105.

In the Second Embodiment, the position and orientation of the vehicle is estimated based on the output information from the stereo camera serving as the position and orientation 105 after it has been multiplied by the second weighting, and the output information from the inertial sensor 104 after it has been multiplied by the first weighting. The estimation method for the position and orientation is the same as that in the First Embodiment, and therefore, an explanation thereof will be omitted.

According to the Second Embodiment, by setting the second weighting as low in a case where the degree of reliability of the output information from the image capturing apparatus or distance measuring apparatus that serves as the position and orientation sensor 105 is low, the usage ratio of incorrect sensor output information is lowered, and it is possible to decrease the lowering of the procession of the position and orientation estimation.

In the Second Embodiment, as the calculation method for the degree of reliability for the output information from the position and orientation sensor 105 by the degree of reliability calculation unit 201, the reliability is made low in a case where the number of feature points in an image that has been captured by an image capturing apparatus such as a stereo camera or the like that serves as the position and orientation sensor 105 is small. However, the method is not limited thereto. For example, the degree of reliability may also be set as low in a case where there is a deviation in the distribution of feature points in an image that has been captured by the image capturing apparatus such as a stereo camera or the like that serves as the position and orientation sensor 105, Specifically, the screen is segmented into a plurality of segments according to a segmentation method that has been selected by the user or predetermined in a system, and whether or not a number of feature points that is at or a above a pre-determined threshold exists in each segment is determined. In addition, in a case where the sum total of the number of segments in which the number of existing feature points is at or above the predetermined threshold is below a pre-determined threshold, it is determined that there is a deviation.

In addition, the degree of reliability may also be made low in a state in which the average brightness in the image or the brightness of the space around the vehicle that has been measured by an external sensor is too bright (a state in which the image is overexposed), or conversely in a state in which the image is too dark (a crushed black state). Specifically, in a case where the average pixel value in an image is larger than a predetermined threshold, it is determined to be too bright, and in a case where this value is smaller than the predetermined threshold, it is determined to be too dark.

In addition, an illumination sensor may be used, and it may be determined that it is too bright in the case that the value for the illumination sensor is larger than the threshold, and it may be determined that it is too dark in the case that this value is smaller than the predetermined threshold. The threshold for determining that it is too bright is made a value that is larger than the threshold for determining that it is too dark.

Alternatively, in cases in which there are sudden changes in the luminance, such as in a case where the luminance repeatedly changes, the case in which luminance changes are large, or the like, the degree of reliability may also be made low. Specifically, consecutive images in a time series are acquired, and in a case where the average luminance in the images has changed with the passage of time by an amount that is at or over a predetermined threshold, it is determined that the luminance has suddenly changed, and in a case where this state occurs repeatedly, it is determined that illumination changes are occurring repeatedly.

Alternatively, in a case where it has been detected that there is a large number of moving bodies, accurate map information cannot be generated, and therefore, the degree of reliability may also be made low. Specifically, object identification by machine learning or the like is performed on the time series images, and in a case where the number of objects for which the positions thereof move within the image along with the passage of time is large, the degree of reliability is made low. In contrast, motion detection technology or the like that uses background differences may also be used to detect moving bodies.

Alternatively, in a case where object recognition by machine learning and the like is performed and it is determined that a mirror, or a window that transmits light is present, the feature points can also not be accurately obtained, and therefore the degree of reliability may also be made low. In addition, in a case where similar backgrounds continue as well, the present location cannot be determined, and therefore, the degree of reliability may also be made low.

In addition, in a case where object recognition by machine learning or the like is performed and it is determined that a large door that takes up a large portion of the field of view of the stereo camera is present as well, the feature points will change depending on whether the door is open or closed, and therefore, the degree of reliability may also be made low.

That is, the degree of reliability may also be calculated according to the presence or absence of a predetermined subject in an image. In addition, the position and orientation sensor is not limited to a stereo camera, and a distance measuring apparatus that can estimate the position and orientation by using the feature points in the same manner may also be used. Furthermore, in a case where a GPS is used in the position and orientation sensor 105, the degree of reliability may also be made low in a case where the reception and transmission state for the radio waves is poor, such as in a building or the like. It is sufficient if the degree of reliability is calculated based on at least one of this plurality of degree of reliability calculation methods. However, a plurality of these may of course also be combined.

In addition, in the Second Embodiment, as the determination method for the second weighting by the second weighting determining unit 203, it has been made such that the second weighting is set as 0 for the case in which the degree of reliability is at or below the predetermined threshold, or is set to a value that is lower than the value in a case where the degree of reliability is not at or below a predetermined threshold. However, the present invention is not limited thereto. For example, it may be made such that the value for the second weighting is made incrementally larger as the value for the degree of reliability increases.

In addition, in the Second Embodiment, it has been made such that the estimation of the position and orientation for the vehicle is performed based on the output information from the position and orientation sensor 105 after it has been multiplied by the second weighting and the output information from the inertial sensor 104 after it has been multiplied by the first weighting, however the estimation of the position and orientation is not limited thereto. For example, it may also be made such that in a case where the second weighting is at or below a predetermined threshold, the output information from the position and orientation sensor 105 is not used.

In addition, each of the output information from the position and orientation sensor 105 that has been multiplied by the second weighting, and the output information from the inertial sensor 104 that has been multiplied by the first weighting can be used to estimate position and orientations, and the two position and orientations that are the estimation results can be synthesized.

In addition, a position and orientation that has been estimated from the output information from the position and orientation sensor 105 and then been multiplied by the second weighting, and a position and orientation that has been estimated from the output information from the inertial sensor 104 and then been multiplied by the first weighting may also be synthesized.

The estimation method for the position and orientation using both the position and orientation sensor 105 and the inertial sensor 104, as well as the synthesizing methods therefor are the same as those in the First Embodiment, and therefore, explanations thereof will be omitted. In addition, in a case where both the first weighting and the second weighting are both low values, such as values that are at or below a predetermined threshold, the output information from both of the sensors cannot be relied on, and therefore, it may also be made such that the vehicle is stopped.

In addition, it may also be made such that the vehicle is decelerated. In addition, a warning display on the display unit 216 that alerts the user may also be performed. In addition, a warning sound may also go off.

Third Embodiment

In a Third Embodiment, the movement and posture such as rotation or the like of vehicle are changed so as to reduce the effect of the noise from the output information from the inertial sensor based on the movement state of the vehicle, and the position and orientation estimation results.

In particular, an example will be explained in which, by performing changes in the movement and the posture such as rotations or the like, and making the value for the output information from the inertial sensor large in a case where the movement state of the vehicle is a state of rest, the effects of the noise can be reduced, and the lowering of the precision of the position and orientation estimation is reduced.

The function blocks for the Third Embodiment are the same as the function blocks that are shown in FIG. 1, and therefore, explanations thereof will be omitted. However, the processing in the control unit 108 differs from that in the First Embodiment.

That is, the control unit 108 in the Third Embodiment performs changes to the movements and posture of the vehicle to reduce the effects of noise from the output information from the inertial sensor 104 based on the movement state that has been acquired by the movement state acquisition unit 102, and the position and orientation that has been estimated by the position and orientation estimation unit 107.

Figure 6:
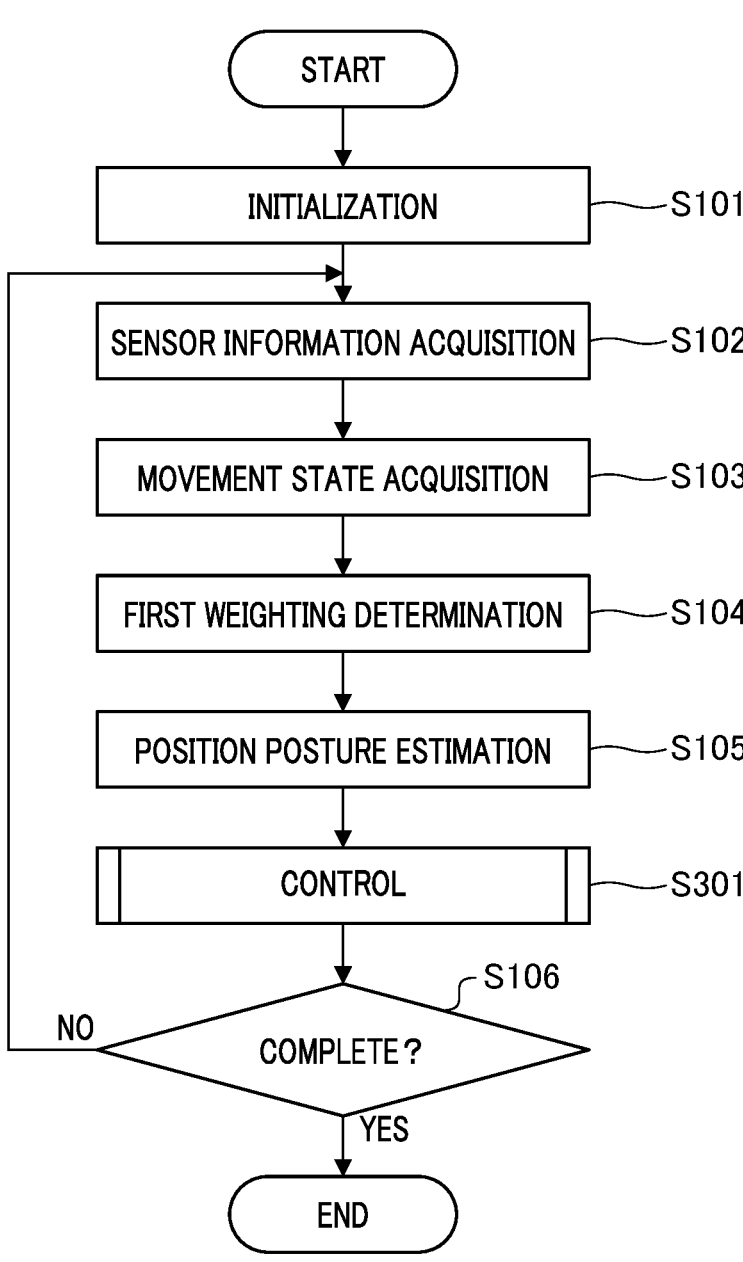
FIG. 6 illustrates a flow chart showing processing executed by an information processing apparatus in a Third Embodiment.

FIG. 6 illustrates a flow chart showing processing that is executed by an information processing apparatus in the Third Embodiment. Explanations of the steps that are the same as those in the flowchart in FIG. 3 will be omitted, and only the processing that is different from that in the First Embodiment will be explained.

In step S301, changes are performed to the movements and posture of the rotation and the like of the vehicle to reduce the effects of noise from the output information from the inertial sensor 104 based on the movement state that has been acquired by the movement acquisition unit 102 and the position and orientation that has been estimated by the position and orientation estimation unit 107. The details of the processing for step S301 will be explained using FIG. 7.

Figure 7:
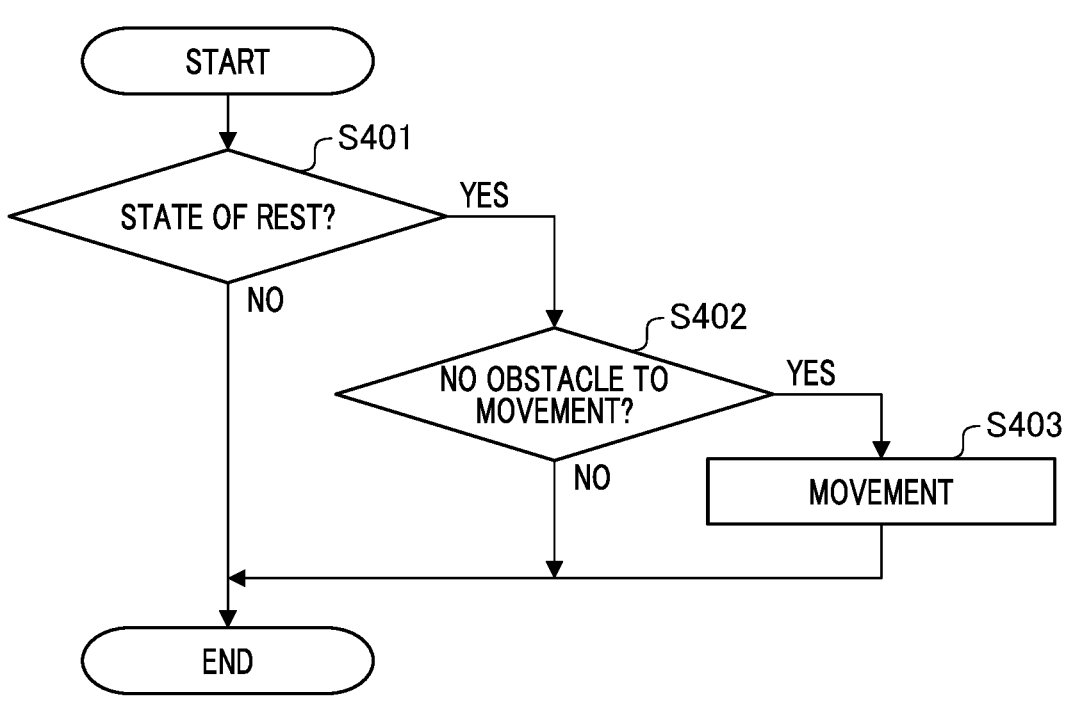
FIG. 7 illustrates a flow chart showing processing for the step S301 in FIG. 6.

FIG. 7 illustrates a flow chart showing processing for the step S301 in FIG. 6. In step S401, whether or not the movement state that was acquired by the movement state acquisition unit 102 is a state of rest is determined. In a case where it is a state of rest, the processing proceeds to step S402, and in a case where it is not a state of rest, the flow in FIG. 7 is completed, and the processing proceeds to step S106 of the flowchart in FIG. 6.

In step S402, if there will not be any obstacles even if the movement and posture are changed is determined taking into consideration the current position and posture of the vehicle that have been estimated by the position and orientation estimation unit 107. As the determination for whether there will not be any obstacles even if the movement and posture of the vehicle are changed, in a case where there are no obstructing objects in the surroundings of the vehicle, particularly in the movement direction or the rotation direction, and the difference in the current position, the position of the orientation and the path, and the direction of travel are equal to or below a predetermined threshold, it is determined that there are no obstacles to changing the movement and posture.

In step S402, in a case where it has been determined that there is no obstacle to changing the movement and posture, the processing proceeds to step S403. In step S403, for example, the movement amount and direction of travel of the vehicle are determined in a range that will not shift the position of the vehicle to above or below the predetermined threshold in relation to the position of the path and direction of travel, the movement and posture of the vehicle are changed.

In this manner, in the Third Embodiment, in a case where the movement state of the vehicle is a state of rest, a change in movement or posture is performed if there are no obstacles to a change in the movement or posture of the vehicle. It is thereby possible to increase the value of the output information from the inertial sensor 104, to reduce the effects of noise from the inertial sensor 104, and to reduce the lowering of the precision of the position and orientation estimation.

Note that, in the Third Embodiment, it has been assumed that in a case where the movement state of the vehicle is a state of rest (or a state in which movement is at or below a predetermined threshold), movement of the vehicle will be performed if there is no obstacle to the movement and the like of the vehicle. However, the present invention is not limited thereto. For example, in a case where the acceleration of the vehicle is at or below a predetermined threshold, a state in which the acceleration is low is determined, and it has been determined that there is no obstacle to the movement and the like of the vehicle in the same manner as in step S402, it may also be made so that the vehicle is accelerated.

In addition, in a case where the angular velocity is at or below a predetermined threshold, a state in which the angular velocity is low has been determined, and it has been determined that there is no obstacle to the movement and the like of the vehicle in the same manner as in step S402, it may also be made so that changes to the movement and posture of the vehicle are performed. In addition, it may also be made so that a determination is made by combining a plurality of these conditions, and movement is thereby performed.

In addition, in the Third Embodiment, movement processing that improves the degree of reliability of the output information from the position and orientation sensor 105 in the Second Embodiment may also be added. For example, in a case where a stereo camera or a distance measuring apparatus are being used as the position and orientation sensor 105, the vehicle may be moved so as to move towards the location that has the largest number of feature points in the acquired image in a case where the number of feature points in the image is small, or there is a deviation in the distribution of the feature points.

In addition, in a case where an object that lowers the degree of reliability such as a mirror, a window that transmits light, a large door, or the like, is present in the image, as was explained in the Second Embodiment, the vehicle may also be made to move so that this object moves outside of the angle of view of the stereo camera and the distance measuring apparatus. Furthermore, in a case where a GPS is used in the position and orientation sensor 105, in a case where the vehicle has moved inside a building or into the shadow of an obstacle, making the radio wave condition poor, the vehicle may also be made to move outside of the building or the shadow of the obstacle and to a position in which the radio wave condition will improve.

Fourth Embodiment

In a Fourth Embodiment, by making the first weighting in relation to the output information from the inertial sensor 104 visible, locations in which the usage conditions for the sensors are poor are displayed to the user, and the user is prompted to perform a movement operation in order to change the path and to reduce the effect of noise from the inertial sensor 104.

The functional blocks in the Fourth Embodiment are predominantly the same as those in FIG. 1. However, they differ on the point that an image generating unit exists. In this context, only the portions that differ from the First Embodiment will be explained.

The image generating unit generates an image that displays the first weighting that has been determined by the first weighting determining unit 103, and this image is displayed on a screen or the like of the display unit by transmission to the display unit 216.

Figure 8:
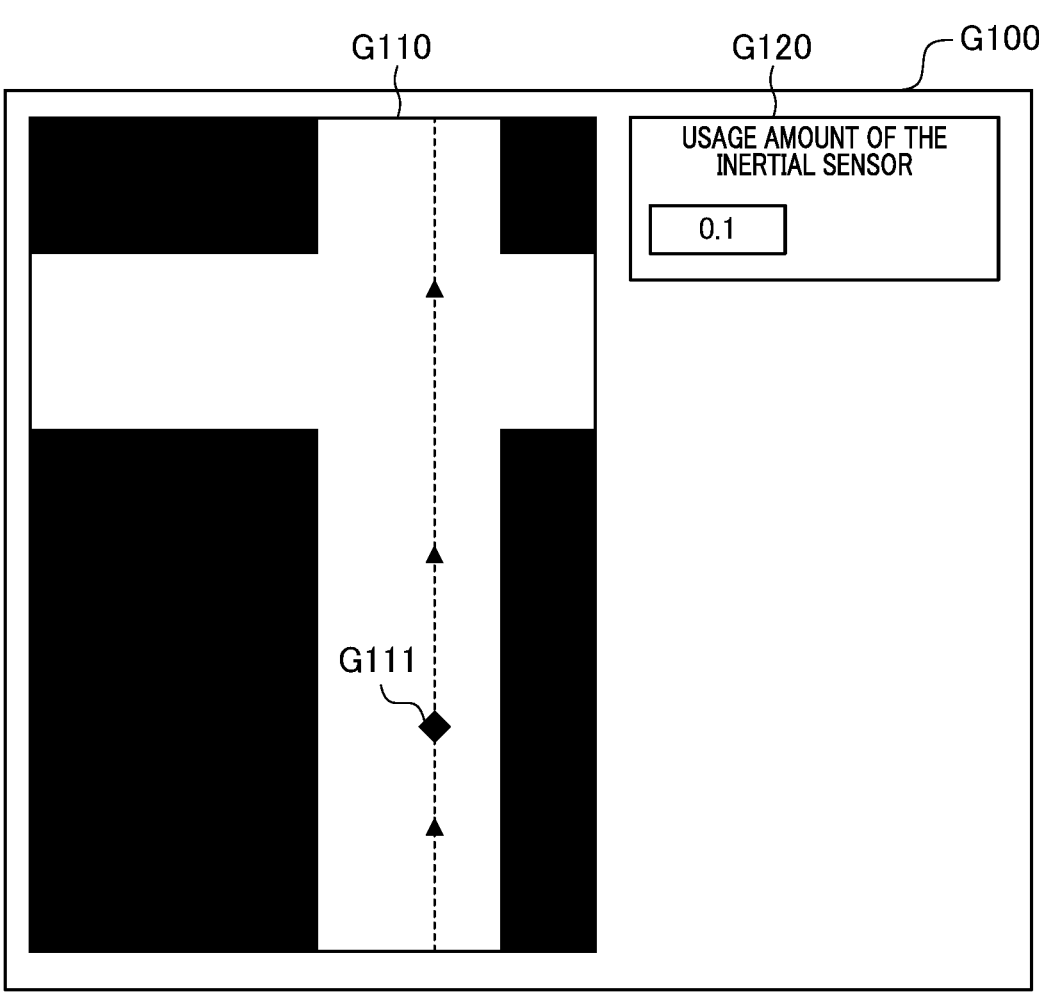
FIG. 8 illustrates a diagram showing an example of a GUI that is displayed on a display unit 216 in a Fourth Embodiment.

FIG. 8 illustrates a diagram showing an example of a GUI that is displayed on a display unit 216 in the Fourth Embodiment. G100 is displayed on the display unit 216 and is display contents that are output by the information processing apparatus 100, and may be displayed on the entirety of the screen, or may also be displayed on a portion of the screen.

G110 shows the horizontal plain of the movement space when seen from above with respect to the movement path of the vehicle. The black portions in this diagram are walls or the like, and the white portions show the path. The vehicle moves along the path that is the white portions. The dotted arrows show the travel path, and G111 is an icon showing the current position of the vehicle.

G120 displays the first weighting in relation to the output value for the inertial sensor 104 as a "usage amount".

Note that the display method is not limited thereto. In the example in the present diagram, the vehicle is moving in uniform linear motion, and therefore, the acceleration is essentially 0. Due to this, the first weighting becomes 0.1, and a state in which 0.1 times the output information from the inertial sensor 104 is used is shown. It is thereby possible for the user to grasp that the usage ratio for the output information from the inertial sensor 104 is low.

In this manner, in the Fourth Embodiment, by making the first weighting in relation to the output information from the inertial sensor 104 visible together with the current position of the vehicle, it is possible to show the user the locations in which the usage conditions for the inertial sensor 104 are poor. In addition, it is also possible to prompt the user to change the path or to perform a movement operation in order to reduce the effects of the noise from the inertial sensor 104.

Note that in the Fourth Embodiment, the first weighting in relation to the output information from the inertial sensor 104 is made visible. However, the second weighting in relation to the output information from the position and orientation sensor 105 may also be made visible. In addition, both may also be made visible at the same time. Note that although the first weighting is displayed as a numerical value in the Fourth Embodiment, it may also be displayed by, for example, having the color or size of the icon G111 change according to the size of the value for the weight.

In addition, in a case where the weight is at or below a predetermined threshold, it may also be made so that the icon G111 is made to blink, so that its color and size changes, or so that a written warning about the decrease in the usage percentage of the inertial sensor 104 is displayed. In a case where the weight is set in relation to a plurality of sensors, color segmentation of the icon G11 may also be performed so as to distinguish for which sensor the weight has been lowered.

As has been explained above, in the First Embodiment, a reduction in the lowering of the precision of the position and orientation estimation is made possible by lowering the usage ratio of the inertial sensor 104 and reducing the effects of the noise from the inertial sensor 104 by setting the first weighting low in a case in which the vehicle is in a state of rest.

In addition, in the Second Embodiment, it is possible to reduce the usage ratio of the output of an incorrect sensor, and to reduce the lowering of the precision of the position and orientation estimation by setting the second weighting as low in a case where the degree of reliability of the output information from an image capturing apparatus or a distance measuring apparatus is low.

In addition, in the Third Embodiment, reducing the effects of the noise, and reducing the lowering of the precision of the position and orientation estimation are made possible by starting movement, and making the value for the output information from the inertial sensor 104 large in a case where the movement state of the vehicle is a state of rest.

In the Fourth Embodiment it is possible to show the user locations in which the usage conditions for the sensor are poor by making the first weighting in relation to the output information from the inertial sensor 104 visible, and it is also possible to prompt the user to change the path, and to a perform movement operation in order to reduce the effects of the noise from the inertial sensor 104.

Note that estimation processing for the position and orientation of the vehicle may also be performed by suitably combining the four forms from the above First Embodiment onwards. It is thereby possible to perform more detailed and precise estimation of the position and orientation of a vehicle.

In addition, in the above examples, a position and orientation sensor 105 is provided in addition to the inertial sensor 104. However, the First, Third, and Fourth Embodiments can also be applied to a configuration in which there is no position and orientation sensor 105.

Note that, in the above Examples, the vehicle may be an AGV or AMR (self-driving robot apparatus), and has a driving apparatus such as a movement motor, an engine, or the like for performing the movement (travel) of the AGV and AMR, as well as a movement direction control apparatus for changing the movement direction of the AGV and AMR. In addition, there is also a movement control unit that controls the drive amount of the driving apparatus and the movement direction of movement direction control apparatus.

The movement control unit has built into it a CPU serving as an internal computer and a memory that has stored a computer program, and performs communications with other apparatuses. Thereby, in addition, for example, to controlling the information processing apparatus 100, position and orientation information, travel path information, and the like are thereby acquired from the information processing apparatus 100.

The AGV and AMR that serve as the vehicle are configured such that the movement direction, movement amount, and movement path of the AGV and AMR are controlled by the movement control unit based on the position and orientation information, travel path information, and the like that have been generated by the information processing apparatus 100.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2021-146513 filed on Sep. 8, 2021, which is hereby incorporated by reference herein in its entirety.

What is claimed is:

1. An information processing apparatus, comprising:
an inertial sensor provided in a vehicle;
a position and orientation sensor provided in the vehicle separately from the inertial sensor, wherein the position and orientation sensor measures a position and an orientation of the vehicle; and
at least one processor or circuit configured to function as:
a position and orientation estimation unit configured to perform a first estimation processing by using an output from the inertial sensor to generate a first estimation result, perform a second estimation processing by using an output from the position and orientation sensor to generate a second estimation result, and to integrate the first estimation result and the second estimation result to perform estimation processing for a position and an orientation of the vehicle;
a movement state acquisition unit configured to acquire a movement state of the vehicle as to whether or not the vehicle is in a state of rest or is in a state of not rest;
a first weighting determining unit configured to determine, when the position and orientation estimation unit integrates the first estimation result and the second estimation result, a first weighting of the first estimation result to be weighted lower than the second estimation result in a case where the movement state of the vehicle that has been acquired by the movement state acquisition unit is in the state of rest than in the state of not rest;
a control unit configured to control a movement of the vehicle based on the estimation processing for the position and the orientation of the vehicle that has been estimated by the position and orientation estimation unit;
a degree of reliability acquisition unit configured to acquire a degree of reliability for the position and orientation that has been measured by the position and orientation sensor; and
a second weighting determining unit configured to determine a second weighting in relation to the output information from the position and orientation sensor based on the degree of reliability,
wherein the position and orientation estimation unit performs the estimation processing based on the output from the position and orientation sensor, the output from the inertial sensor, the first weighting, and the second weighting.

2. The information processing apparatus according to claim 1, wherein the position and orientation sensor includes at least one of an image capturing unit configured to capture images of a subject, a distance measuring unit configured to measure a distance of a subject, a GPS, or a LiDAR.

3. The information processing apparatus according to claim 2, wherein the movement state acquisition unit and the position and orientation sensor use the image capturing unit.

4. The information processing apparatus according to claim 1, wherein the movement state acquisition unit acquires the movement state of the vehicle by using at least one of an image capturing unit, a distance measuring unit, an encoder, a GPS, or a drive command to a drive source.

5. The information processing apparatus according to claim 1, wherein the movement state acquisition unit acquires, as the movement state, at least one of whether or not a movement amount of the vehicle is below a predetermined threshold, whether or not an acceleration of the vehicle is below a predetermined threshold, or whether or not an angular velocity of the vehicle is below a predetermined threshold.

6. The information processing apparatus according to claim 1, wherein the first weighting determining unit makes the first weighting in relation to the output information from the inertial sensor lower than a predetermined value in a case where at least one of a movement amount of the vehicle is below a predetermined threshold, an acceleration of the vehicle is below a predetermine threshold, or an angular velocity of the vehicle is below a predetermined threshold.

7. The information processing apparatus according to claim 1, wherein the degree of reliability acquisition unit calculates the degree of reliability based on at least one from among a number or a distribution of feature points detected from an image from the output from the position and orientation sensor, a luminance of the image, change of the luminance, a number of moving bodies in the image, a presence or absence of a pre-determined subject in the image, or a radio wave reception state for a GPS.

8. The information processing apparatus according to claim 1, wherein the control unit is configured to move or change a posture of the vehicle.

9. The information processing apparatus according to claim 8, wherein the control unit performs control to make the vehicle accelerate or decelerate in a case where an acceleration of the vehicle is at or below a predetermined threshold.

10. The information processing apparatus according to claim 8, wherein the control unit performs control to change the movement or the posture of the vehicle in a case where an angular velocity of the vehicle is at or below a predetermined threshold.

11. The information processing apparatus according to claim 1, wherein the control unit is further configured to control a change in movement or posture of the vehicle to improve the degree of reliability in a case where the degree of reliability that has been acquired by the degree of reliability acquisition unit is at or below a predetermined threshold.

12. The information processing apparatus according to claim 1, further comprising a display unit configured to display a weighting determined by the first weighting determining unit along with a current position of the vehicle.

13. The information processing apparatus according to claim 1, wherein the degree of reliability acquisition unit is configured to acquire the degree of reliability for the position and orientation based on at least one of the number of feature points in an image, a deviation in the distribution of feature points in an image, a brightness in the image, the number of objects, or the reception state for the radio wave.

14. A vehicle comprising:

an inertial sensor provided in the vehicle;

a position and orientation sensor provided in the vehicle separately from the inertial sensor, wherein the position and orientation sensor measures a position and an orientation of the vehicle; and at least one processor or circuit configured to function as:

a position and orientation estimation unit configured to perform a first estimation processing by using an output from the inertial sensor to generate a first estimation result, performs a second estimation processing by using an output from the position and orientation sensor to generate a second estimation result, and integrates the first estimation result and the second estimation result to perform estimation processing for a position and orientation of the vehicle;

a movement state acquisition unit configured to acquire a movement state of the vehicle as to whether or not the vehicle is in a state of rest or is in a state of not rest;

a first weighting determining unit configured to determine, when the position and orientation estimation unit integrates the first estimation result and the second estimation result, a first weighting of the first estimation result to be weighted lower than the second estimation result in a case where the movement state of the vehicle that has been acquired by the movement state acquisition unit is in the state of rest than in the state of not rest;

a movement control unit configured to control a movement of the vehicle based on the estimation processing for the position and the orientation of the vehicle that has been estimated by the position and orientation estimation unit;

a degree of reliability acquisition unit configured to acquire a degree of reliability for the position and orientation that has been measured by the position and orientation sensor; and a second weighting determining unit configured to determine a second weighting in relation to the output information from the position and orientation sensor based on the degree of reliability, wherein the position and orientation estimation unit performs the estimation processing based on the output from the position and orientation sensor, the output from the inertial sensor, the first weighting, and the second weighting.

15. An information processing method executed by an information processing apparatus provided with an inertial sensor provided in a vehicle, and a position and orientation sensor provided in the vehicle separately from the inertial sensor, wherein the position and orientation sensor measures a position and an orientation of the vehicle, the method executed by at least one processor or circuit and comprising:

a position and orientation estimating step of performing a first estimation processing by using an output from the inertial sensor to generate a first estimation result, performing a second estimation processing by using an output from the position and orientation sensor to generate a second estimation result, and integrating the first estimation result and the second estimation result to perform estimation processing for position and an orientation of the vehicle;

acquiring a state of movement of the vehicle as to whether or not the vehicle is in a state of rest or is in a state of not rest;

determining, when the position and orientation estimating step integrates the first estimation result and the second estimation result, a first weighting of the first estimation result to be weighted lower than the second estimation result in a case where the movement state of the vehicle that has been acquired by the acquiring is in the state of rest than in the state of not rest;

controlling a movement of the vehicle based on the estimation processing for the position and the orientation of the vehicle that has been estimated by the position and orientation estimating step;

a degree of reliability acquisition step of acquiring a degree of reliability for the position and orientation that has been measured by the position and orientation sensor; and determining a second weighting in relation to the output information from the position and orientation sensor based on the degree of reliability, wherein the position and orientation estimation step performs the estimation processing based on the output from the position and orientation sensor, the output from the inertial sensor, the first weighting, and the second weighting.

16. A non-transitory computer-readable storage medium storing a computer program executed by an information processing apparatus including an inertial sensor provided in a vehicle and a position an orientation sensor provided in the vehicle separately from the inertial sensor, wherein the position and orientation sensor measures a position and an orientation of the vehicle, the computer program comprising code to execute the following processes:

a position and orientation estimating step of performing a first estimation processing by using an output from the inertial sensor to generate a first estimation result, performing a second estimation processing by using an output from the position and orientation sensor to generate a second estimation result, and integrating the first estimation result and the second estimation result to perform estimation processing for position and an orientation of the vehicle;

acquiring a state of movement of the vehicle as to whether the vehicle is in a state of rest or is in a state of not rest;

determining, when the position and orientation estimating step integrates the first estimation result and the second estimation result, a first weighting of the first estimation result to be weighted lower than the second esti-
mation result in a case where the movement state of the
vehicle that has been acquired by the acquiring is in the
state of rest than in the state of not rest;
controlling a movement of the vehicle based on the
estimation processing for the position and the orienta-
tion of the vehicle that has been estimated by the
position and orientation estimating step;
a degree of reliability acquisition step of acquiring a
degree of reliability for the position and orientation that
has been measured by the position and orientation
sensor; and
determining a second weighting in relation to the output
information from the position and orientation sensor
based on the degree of reliability,
wherein the position and orientation estimation step per-
forms the estimation processing based on the output
from the position and orientation sensor, the output
from the inertial sensor, the first weighting, and the
second weighting.

* * * * *